United States Patent [19]

Hough

[11] Patent Number: 5,488,898

[45] Date of Patent: Feb. 6, 1996

[54] SPIN BLENDER FEED COATING

[75] Inventor: Richard M. Hough, Lansing, Mich.

[73] Assignee: Hough International, Inc., Albertville, Ala.

[21] Appl. No.: 28,397

[22] Filed: Mar. 9, 1993

[51] Int. Cl.$^6$ ..................................................... A23B 4/14
[52] U.S. Cl. ............................... 99/516; 99/534; 366/146
[58] Field of Search ............................ 99/516, 519, 521, 99/536, 534; 118/303; 134/147; 366/146

[56] References Cited

U.S. PATENT DOCUMENTS

| | | |
|---|---|---|
| 1,468,119 | 9/1923 | MacLachlan . |
| 1,855,548 | 4/1932 | Forster . |
| 1,869,235 | 7/1932 | Bartling . |
| 2,071,846 | 2/1937 | Lamb et al. ............................ 91/44 |
| 2,319,865 | 5/1943 | James ..................................... 91/44 |
| 2,561,394 | 7/1951 | Marshall ............................. 117/100 |
| 2,823,904 | 2/1958 | Gustafson ............................ 259/24 |
| 2,953,359 | 9/1960 | Mau ....................................... 259/8 |
| 2,955,956 | 10/1960 | Baugh et al. ...................... 117/100 |
| 3,001,465 | 9/1961 | Donelson, Jr. ....................... 99/516 |
| 3,013,525 | 12/1961 | Fuller et al. ............................ 118/8 |
| 3,017,854 | 1/1962 | O'Brien ............................... 118/303 |
| 3,033,159 | 5/1962 | O'Brien ............................... 118/303 |
| 3,086,712 | 4/1963 | Frazier ................................. 239/15 |
| 3,177,058 | 4/1965 | Slayter et al. ........................ 65/15 |
| 3,288,052 | 11/1966 | Hough .................................. 99/235 |
| 3,717,086 | 2/1973 | Hough .................................. 99/516 |
| 3,912,231 | 10/1975 | Weber ................................. 118/303 |
| 4,275,682 | 6/1981 | Weber ................................. 118/303 |
| 4,407,217 | 10/1983 | Jackson .............................. 118/303 |
| 4,520,754 | 6/1985 | Gange et al. ....................... 118/303 |
| 4,596,206 | 6/1986 | Berge et al. ........................ 118/303 |
| 4,657,773 | 4/1987 | Mueller .............................. 118/303 |
| 4,689,249 | 8/1987 | Thygesen ........................... 118/303 |

Primary Examiner—David Scherbel
Assistant Examiner—James F. Hook
Attorney, Agent, or Firm—Price, Heneveld, Cooper, DeWitt & Litton

[57] ABSTRACT

Apparatus for applying liquid to particulate materials using a single drive motor to operate both the upper particle dispersing disc and the lower liquid dispersing disc, the latter disc being driven at a much higher speed than the former. The two dispersing discs have coaxial drive, one hollow drive shaft within the other, but are driven at different rotational speeds optimum for the material being dispersed from the respective discs. The liquid is fed through the inner hollow drive shaft to its disc. The particulate feed rate is controllable with a presettable throttling or feed rate regulator sleeve. The sleeve has tooth features cooperative with abutment features of the underlying particle dispersing disc to neutralize lumps, chunks and pieces of paper and the like in the feed material. After the solid particles are coated with liquid, the particles are specially mixed using apparatus that also maintains the housing chamber clean so as not to accumulate product therein to contaminate subsequent materials, and driven by the same single drive motor. This apparatus is particularly advantageous for producing fat coated animal feed and the like.

5 Claims, 3 Drawing Sheets

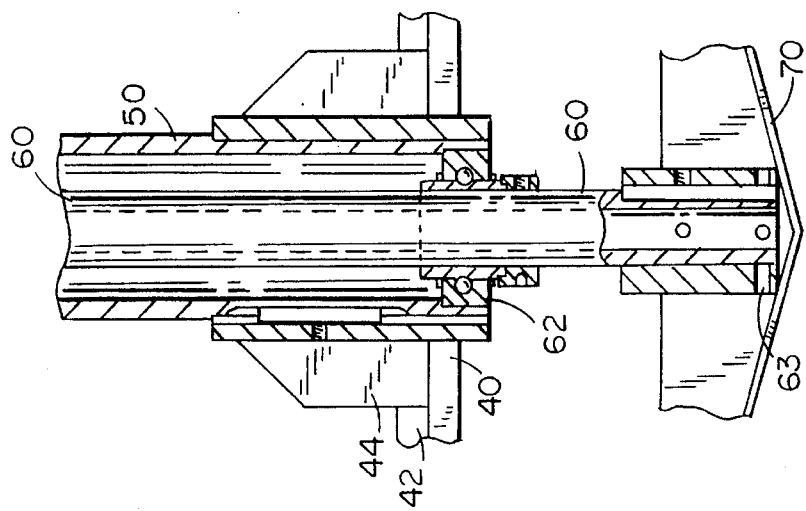
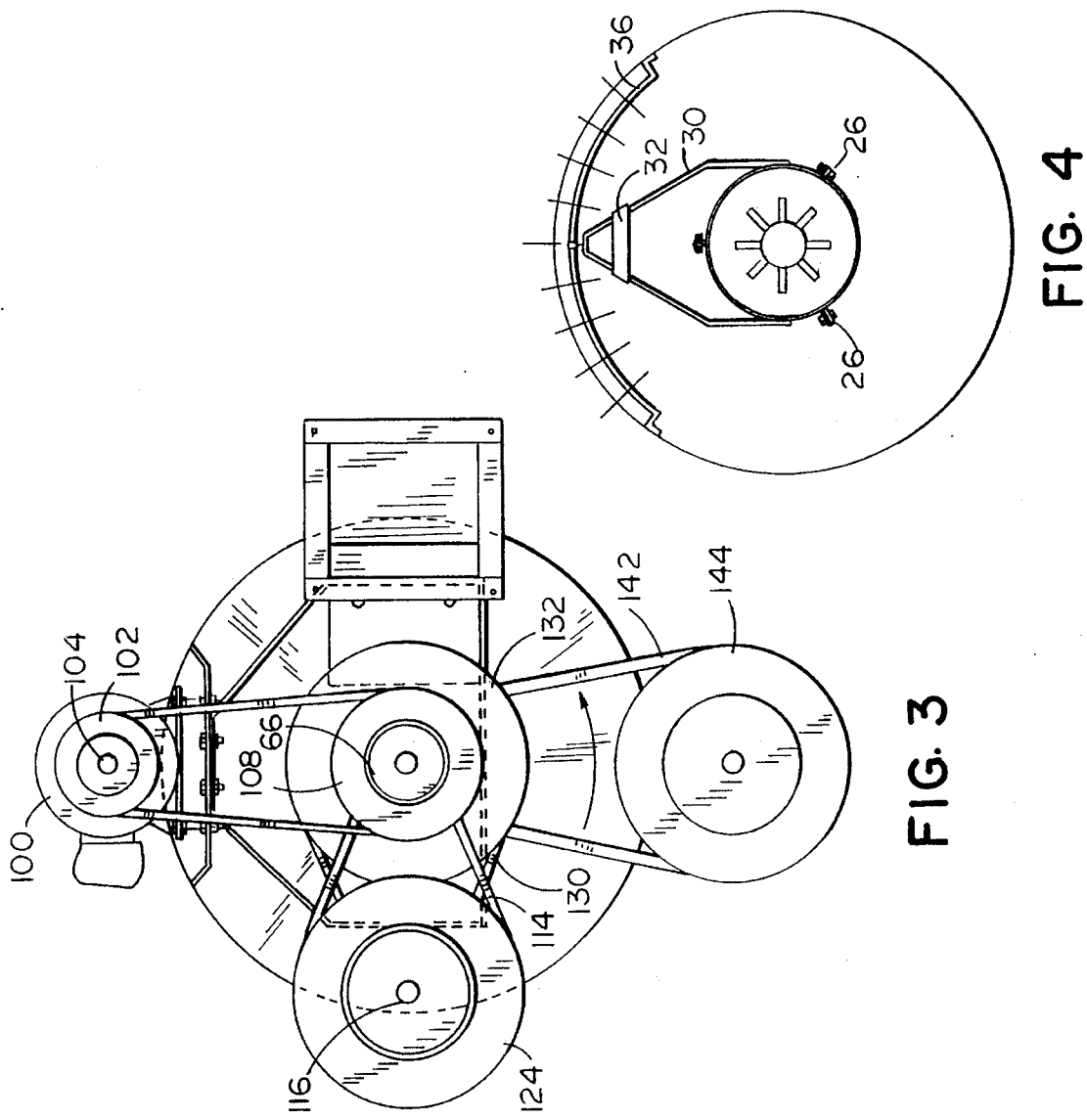

SPIN BLENDER FEED COATING

BACKGROUND OF THE INVENTION

This invention relates to apparatus for applying a liquid to particulate solid materials, such as coating liquid feed ingredients onto solid feed particles for animals.

Various forms of apparatus have been developed heretofore to apply a liquid onto solid particulate material, e.g., a fat and/or vitamins, feed supplements or the like, onto solid particles of animal feed. Those set forth in the inventor's prior U.S. Pat. Nos. 3,288,052 and 3,717,086 are exemplary. Typically, the particulate material is dropped onto a spinning disc which creates an annular curtain of falling particles onto which the liquid is ejected from another underlying rotating disc. The particle dispersing disc is mounted on and driven by a depending shaft, while the liquid dispersing disc is driven by an underlying motor. In the U.S. Pat. No. 3,717,086, the particles are propelled from a disc driven by an external motor, the particles then striking and falling from a sloping annular wall. The liquid is dispensed from a disc connected to another underlying external motor.

Although these items of equipment are believed to have operated better than the previously available devices, the inventor determined that there should be a simpler apparatus less likely to plug, capable of handling chunks of feed that might periodically occur, or pieces of paper or the like which may be contained in the particulate material, without disruption of the apparatus. The interior surfaces should remain clean of the product, and the apparatus should be capable of quick modification to handle various types of products and rates of flow, and not require a drive motor or drive mechanism below the liquid dispersing disc to potentially contaminate the product, or be fouled thereby, or cause product hangup.

SUMMARY OF THE INVENTION

An object of this invention, therefore, is to provide apparatus for continuously applying a liquid reagent to particulate solid material, with control over the rate of the application, without the need for nozzles, utilizing only one drive motor, and not requiring a drive below the liquid dispersing disc.

Another object of the invention is to provide unique apparatus for applying liquid to particulate materials using a single drive motor to operate both the upper particle dispersing disc and the lower liquid dispersing disc, the latter disc being driven at a much higher speed than the former. The particulate feed rate is controllable with a presettable throttling or feed rate regulator sleeve. The sleeve has features cooperative with features of the underlying particle dispersing disc to neutralize lumps, chunks, and pieces of paper and the like in the feed material. After the solid particles are coated with liquid, the particles are specially mixed using apparatus that also maintains the housing chamber clean so as not to accumulate product therein to contaminate subsequent materials, and driven by the same single drive motor. This apparatus is particularly advantageous for producing fat coated animal feed and the like.

Another object of this invention is to provide apparatus for coating particulate materials with liquid, having a simpler structure than prior apparatus, the two dispersing discs having coaxial drive, one within the other, but driven at different rotational speeds optimum for the material being dispersed from the respective discs.

These and other objects, advantages and features of the invention will become apparent upon studying the following specification in conjunction with the drawings.

BRIEF DESCRIPTION OF THE DRAWINGS

FIG. 3 is a top plan view of the novel apparatus;

FIG. 4 is a sectional, reduced view taken on plane IV—IV of FIGS. 1 and 2; and

FIG. 5 is an enlarged, fragmentary, elevational, sectional view of central portions of the liquid dispersing disc and the drive and bearing relationship therebetween.

DESCRIPTION OF THE PREFERRED EMBODIMENT

Figure 1:
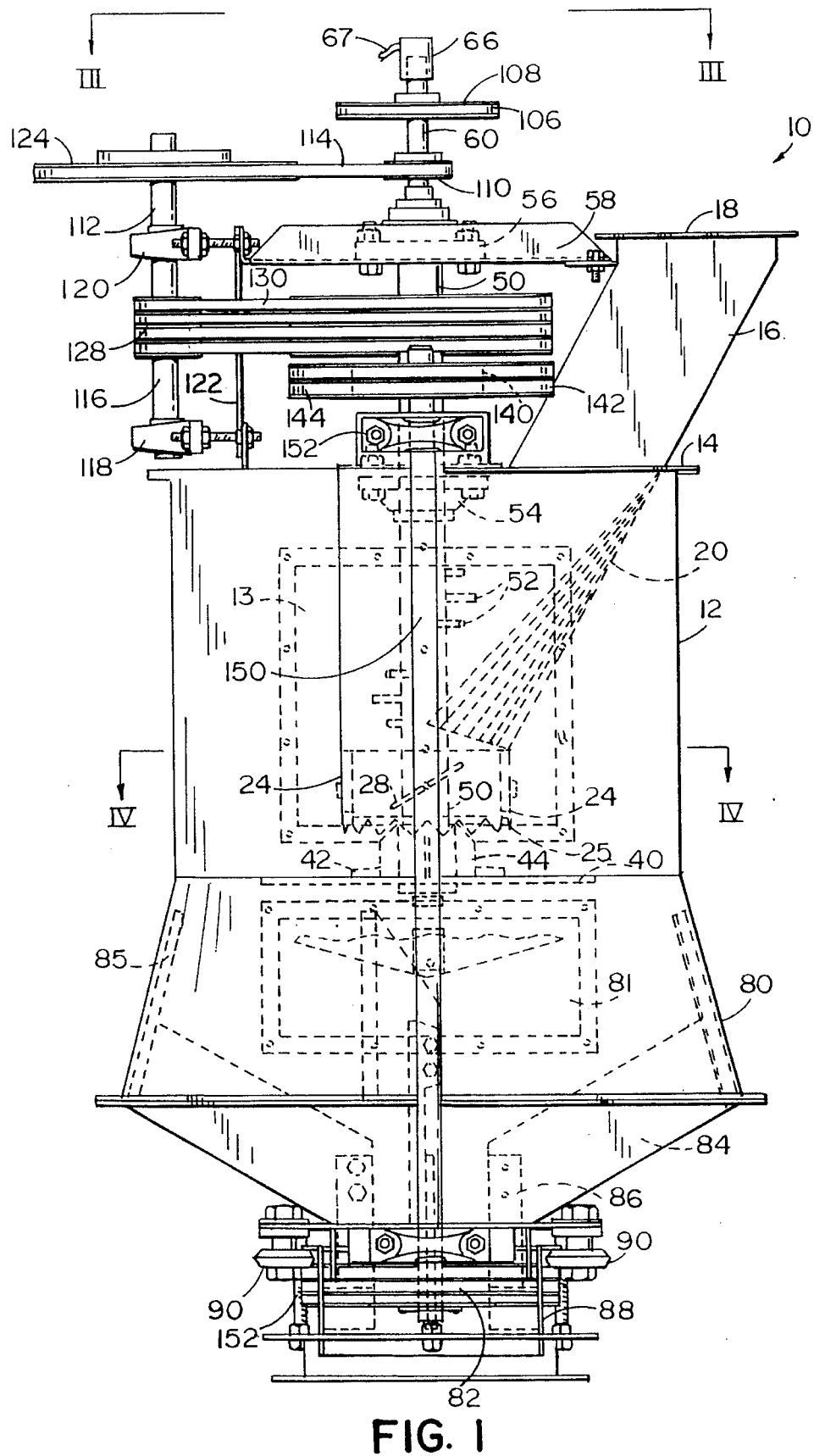
FIG. 1 is a side elevational view of the novel apparatus.

Referring now specifically to the drawings, the liquid applicator apparatus 10 is shown to include a housing 12 of generally cylindrical configuration, having a top closure plate 14 through which diagonally extends a hopper inlet chute 16 having an upper hopper inlet opening 18 leading down into a hopper 20 centrally located in the housing. These hopper inlet, hopper inlet chute and hopper elements are for receiving particulate solid material such as animal feed particles. At the base of hopper 20 is a particulate feed rate regulator 24 which is vertically adjustable and fixable in an adjusted position. Specifically, this speed rate regulator comprises a cylindrical member which is coaxial with and is physically attached to the bottom of hopper 20 by a plurality of bolts 26, here shown to be three (FIG. 4), at equally spaced intervals around the periphery of the regulator. These bolts extend through the base of the hopper and through diagonal slots 28 (FIG. 1) in the regulator cylinder, or vice versa, to enable regulator 24 to be vertically shifted by rotationally moving it. This rotational movement can be achieved by angularly shifting a radially outwardly extending forked handle 30 having a manual grip 32 thereon. The two legs of this forked handle 30 are pivotally attached to regulator 24 to enable the handle to be shifted through an angle about its central axis and also to engage an arcuate handle position lock 36 having vertical slots therein for interfitting with the fork member at its apex. Vertical adjustment of the feed regulator 24 changes the vertical spacing between its lower end and the underlying material dispersing disc 40 (FIG. 1). By so controlling the height of this vertical space, the rate of feed of the particulate material to the disc is regulated.

To achieve breakup of lumps of particulate material, or to disperse pieces of paper or other debris in the particulate material, the lower end of regulator 24 is serrated. This defines a plurality of downwardly projecting peripheral teeth 25. These cooperate with radially and horizontally extending breaker bars 42 located at intervals around the central portion of disc 40, and vertically and radially extending breaker flanges 44 at spaced intervals around disc 40. These flanges and bars rotate with the disc to form upwardly extending, revolving protrusions to cooperate with stationary teeth 25 for pulverizing lumps, etc. This disc 40 is mounted to and driven by the lower end of a first hollow central vertical drive shaft 50 extending vertically through the center of hopper 20 and up through the top closure plate 14 of the housing. Around the periphery of shaft 50, preferably located in a helical pattern, is a plurality of stirring pins 52 within hopper 20 to continuously stir the particulate material in the hopper as shaft 50 rotates. Shaft 50 is driven at its upper end by a drive mechanism to be described hereinafter. Shaft 50 is supported by a pair of vertically spaced bearings, with one, 54, mounted to top plate 14, and the other, 56, mounted to structural plate 58 above top plate 14.

Extending down through this outer shaft 50, coaxially therewith, is a second, smaller, inner, hollow drive shaft 60 (FIGS. 1 and 5). Inner shaft 60 is supported in outer shaft 50 by a pair of spaced bearings 62 (FIG. 5) at the lower end of shaft 50 and the upper end of shaft 50. The inner shaft 60 extends up beyond the upper end of shaft 50, with a coupling 66 (FIG. 1) at its upper end. This shaft 60 is driven in a fashion to be described hereinafter.

At the lower end of shaft 60 is an upwardly concave, circular, liquid dispersing disc 70 spaced below particulate dispersing disc 40. The upper, outer, peripheral edge of disc 70 is preferably serrated since this causes a vertically wider band of dispersed liquid during operation. Beneath disc 70 is an extension of housing 12 in the form of a mixing bowl 80 which preferably projects downwardly outwardly to its maximum diameter and then tapers downwardly inwardly to a generally cylindrical, bottom discharge outlet 82.

Figure 2:
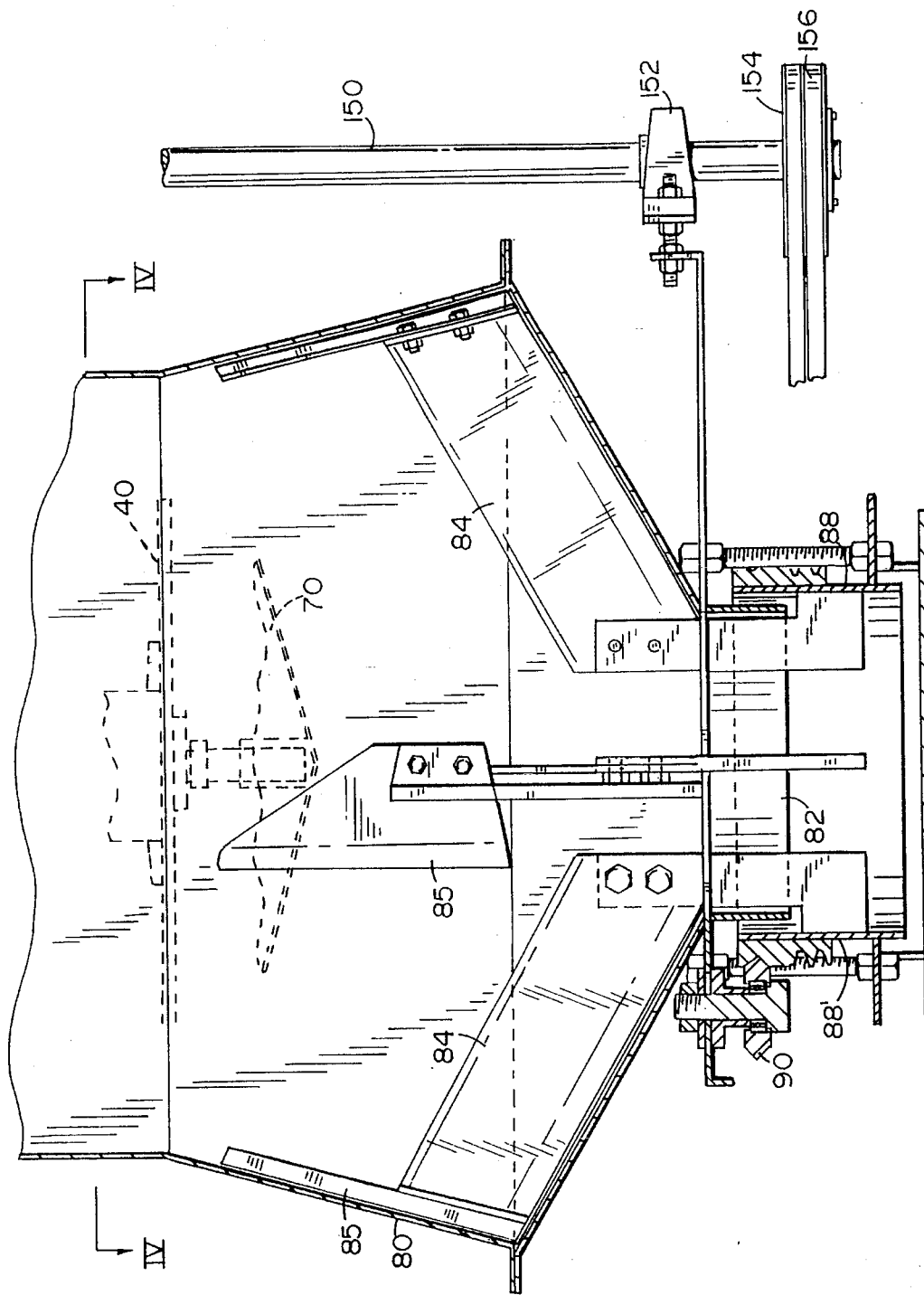
FIG. 2 is a fragmentary, enlarged, sectional view of the lower portion of the novel apparatus.

Within bowl 80 is a plurality of radially extending, peripherally spaced mixer paddles 84 mounted at the radial inner ends thereof to respective vertically extending paddle mounting brackets 86 (FIGS. 1 and 2). These brackets extend down through outlet 82 and are secured to a cylindrical drive sleeve 88. Drive sleeve 88 extends around the outlet and is suspended on a plurality of rollers 90 which interfit in a peripheral groove of sleeve 88, sleeve 88 being rotationally driven as described hereinafter. At the radial outer ends of each of paddles 84 is a wall scraper 85 which engages the peripheral inner wall of bowl 80 to assure cleanliness of the bowl and lack of retention of coated particulate materials to potentially contaminate subsequent materials being treated by the apparatus.

All of the components of this apparatus 10 are driven from a single motor, preferably an electrical motor 100 (FIG. 3). Motor sheave 102 mounted to motor shaft 104 drives an endless drive member such as belt 106 which drives sheave 108 on shaft 60, to rotate this hollow drive shaft 60 at a high rate of speed and thereby rotate liquid dispersing disc 70 at a high rotational speed.

Shaft 60 also rotates sheave 110 mounted thereon to power a speed reduction drive subassembly 112 via an endless drive member such as belt 114. Speed reduction drive subassembly 112 includes a vertical counter drive shaft 116 mounted on vertically spaced bearings 118 and 120 supported by bracket 122. Shaft 116 has a large sheave 124 at its upper end to be driven by the much smaller sheave 110 on shaft 60, thereby causing counter shaft 116 to be rotated at a much lower rotational rate than shaft 60. Furthermore, a four belt sheave 128 on shaft 116 drives belts 130 which in turn power a larger diameter sheave 132 affixed to outer shaft 50, to cause shaft 50 and the particulate material dispensing disc 40 to operate at a much lower rotational rate than disc 70. A smaller diameter sheave 140 (FIG. 1) on shaft 50 drives belts 142, which in turn drive external upper sheaves 144 mounted on external vertical drive shaft 150. Shaft 150 is mounted in appropriate bearings 152 at it upper and lower ends. At the lower end of shaft 150 is a double sheave 154 to drive belts 156 which extend around the larger diameter grooves 88' (FIG. 2) in sleeve 88 to rotate this sleeve and hence paddles 84 and bowl wall scrapers 85.

A removable door 81 allows access into bowl 80. Access into bowl 80 allows cleaning of disc 70 as necessary and repair or replacement of mixer paddles 84 and/or scrapers 85. A removable door 13 allows access into housing 12 for adjustment of flow regulator 24 and access to the material dispersing disc 40.

Liquid entry to the inner hollow drive shaft 60 is made through the coupling 66 at the upper end of shaft 60 from a conduit connection 67. This allows liquid such as fat, vitamins, etc. to flow to and through the interior of drive shaft 60 to the lower end thereof for flow onto disc 70 through outlets 63 (FIG. 5).

During operation, particulate solid material such as animal feed material is introduced into hopper 20 through inlet 18 and down chute 16. At this time, motor 100 is operating to drive the first shaft 50, the second shaft 60 and the exterior shaft 150, to thereby rotate liquid dispersing disc 70 at a high angular rate of speed, solid dispersing disc 40 at a lower rate of speed, arid mixing paddles and sleeve 88 at a still lower rate of speed. There is no motor or drive mechanism beneath liquid dispersing disc 70 to become fouled or to contaminate the system. The entire mechanism is operated very simply with one power input, namely electric motor 100. Liquid such as fat, or fat which contains vitamins or other feed supplements or the like, is introduced through conduit 67 into coupling 66 and thus down through hollow shaft 60 to spinning liquid dispersing disc 70 where it is dispersed radially outwardly in a band of droplets. The solid particulate material is simultaneously dispersed in a falling annular curtain off dispersing disc 40. The liquid dispersed off disc 70 engages the curtain of solid particulate material and thereby coats it and/or penetrates the particles.

The rate of feed of the solid material is governed by the vertical position of regulator 24, i.e., its spacing above disc 40 and the rate of rotation of disc 40. Lumps or other chunks of material in the feed are pulverized by the interengagement of the fixed serrated teeth 25 on the base of regulator 24 and the rotating vertical flanges 44 and the radially extending horizontal breaker bars 42 on disc 40.

The apparatus can be custom suited to any particular type of material and/or installation by selection of the appropriate sheave sizes of the drive mechanism to obtain the desired speed ratio between disc 40 and disc 70. It will be readily visualized by those in the art that the apparatus is simple and capable of customizing to a particular installation or type of material. Conceivably additional advantages of the apparatus not specifically described above will occur to those in the art. It is also conceivable that certain minor variations or modifications could be made in the preferred embodiment of the apparatus disclosed above as exemplary of the invention, without departing from the inventive concept. Hence, the invention is not intended to be limited by the specific preferred embodiment disclosed, but only by the scope of the appended claims and the reasonably equivalent structures to those defined therein.

The embodiments of the invention in which an exclusive property or privilege is claimed are defined as follows:

1. A liquid applicator for applying a liquid to particulate solid material comprising:

a housing having a vertical axis;

a hopper in said housing for retaining and supplying particulate material, and having a base;

a first vertical drive shaft through said housing;

a solid material dispersing disc fixed on said first drive shaft;

a power source;

first power drive connector means from said power source to said first vertical drive shaft for rotating said first drive shaft and said solid material dispersing disc;

flow regulating means at said base of said hopper for controlling flow of particulate solid material from said hopper to said solid material dispersing disc;

a second vertical drive shaft concentric with and inside said first vertical drive shaft;

said second vertical drive shaft being hollow to conduct liquid therethrough;

a liquid dispersing disc located below said solid material dispersing disc, and fixed on said second drive shaft to rotate therewith;

said second hollow vertical drive shaft having liquid flow communication to said liquid dispersing disc;

liquid conduit means to said second hollow vertical drive shaft for conducting liquid through said second drive shaft;

second power drive connector means from said power source to said second vertical drive shaft for rotating said second vertical drive shaft and said liquid dispersing disc;

said liquid dispersing disc being concave upwardly to project liquid at an angle onto solid material from said solid material dispersing disc, and having a serrated outer edge for dispersing liquid droplets over a broad band;

said housing defining a mixing bowl beneath said discs:

rotational mixer paddles in said bowl;

third power drive connector means from said power source to said rotational mixer paddles for rotating said paddles in said bowl;

a discharge from said mixing bowl for solid particulate material on which liquid has been applied;

said flow regulating means being a hollow cylindrical element having a serrated lower edge; and said solid material dispersing disc having lump breaking elements for cooperation with said serrated lower edge.

2. The applicator in claim 1 wherein said lump breaking elements comprise radially extending protrusions on said solid material dispersing disc.

3. A liquid applicator for applying a liquid to particulate solid material comprising:

a housing having a vertical axis;

a hopper in said housing for retaining and supplying particulate material, and having a base;

a first vertical drive shaft through said housing;

a solid material dispersing disc fixed on said first drive shaft;

a power source;

first power drive connector means from said power source to said first vertical drive shaft for rotating said first drive shaft and said solid material dispersing disc;

flow regulating means at said base of said hopper for controlling flow of particulate solid material from said hopper to said solid material dispersing disc;

a second vertical drive shaft concentric with and inside said first vertical drive shaft;

said second vertical drive shaft being hollow to conduct liquid therethrough;

a liquid dispersing disc located below said solid material dispersing disc, and fixed on said second drive shaft to rotate therewith;

said second hollow vertical drive shaft having liquid flow communication to said liquid dispersing disc;

liquid conduit means to said second hollow vertical drive shaft for conducting liquid through said second drive shaft;

second power drive connector means from said power source to said second vertical drive shaft for rotating said second vertical drive shaft and said liquid dispersing disc;

said liquid dispersing disc being concave upwardly to project liquid at an angle onto solid material from said solid material dispersing disc, and having a serrated outer edge for dispersing liquid droplets over a broad band;

said housing defining a mixing bowl beneath said discs;

rotational mixer paddles in said bowl;

third power drive connector means from said power source to said rotational mixer paddles for rotating said paddles in said bowl;

a discharge from said mixing bowl for solid particulate material on which liquid has been applied;

said flow regulating means comprising a hollow cylindrical element releasably secured to said hopper by fasteners, being rotationally movable on said hopper, and having diagonal slots for said fasteners such that rotational movement of said cylindrical element will cause vertical adjustment thereof.

4. The applicator in claim 3 including a handle extending radially from said hollow cylindrical element for adjustment by angular movement of said handle.

5. The applicator in claim 4 including a stop element having a plurality of settings engageable with said handle for indicating adjusted flow rates.

* * * * *